United States Patent [19]

Biancardi

[11] 4,171,883
[45] Oct. 23, 1979

[54] TELEVISION PROJECTOR AND STAND DEVICE AND METHODS OF MAKING AND USING THE SAME

[76] Inventor: Joseph L. Biancardi, 368 Chez Paree, Hazelwood, Mo. 63042

[21] Appl. No.: 854,699

[22] Filed: Nov. 25, 1977

[51] Int. Cl.² .................. G03B 21/28; H04N 5/78
[52] U.S. Cl. ........................ 353/122; 353/98
[58] Field of Search .......... 353/122, 119, 98, 66; 248/346; 358/60, 237, 250

[56] References Cited

U.S. PATENT DOCUMENTS

| 1,616,747 | 2/1927 | Harnett | 353/66 |
| 2,239,728 | 4/1941 | McEnery | 248/346 |
| 2,395,975 | 3/1946 | Schwanhausser | 353/66 |
| 2,735,336 | 2/1956 | Bersudsky | 353/98 |
| 3,820,885 | 6/1974 | Miller | 353/98 |
| 3,949,167 | 4/1976 | Koyama et al. | 358/237 |
| 4,066,231 | 1/1978 | Bahner et al. | 248/13 |

Primary Examiner—Richard E. Aegerter
Assistant Examiner—John W. Shepperd

[57] ABSTRACT

The present invention relates to the combination of a projector and television stand proximate thereto which allows the picture from a conventional television set to be magnified and projected upon a suitable surface and includes a stand provided with angular mounts thereon which allows a conventional television set to be mounted thereon at a particular angle from the horizontal in combination with a projector disposed proximate the face of television set which provided an angularly disposed reflected image from the reflective surface and transmit the image through an aperture in the projector to a suitable display surface.

1 Claim, 3 Drawing Figures

TELEVISION PROJECTOR AND STAND DEVICE AND METHODS OF MAKING AND USING THE SAME

BACKGROUND OF THE INVENTION

Since the advent of television many have attempted to provide a projector system and devices which would accept the picture on a conventional television picture tube and transmit same in magnified form upon a suitable display surface.

Devices in the past have been of such complexity and expense that many potential users have been unable to afford them. Some projectors, while apparently solving the problem require the television set to be disposed in an awkward and unattractive configuration or require relatively expensive modifications to the television set.

SUMMARY

It is therefore an object of the present invention to provide a television stand and projector device which utilizes a stand which allows the television to be conveniently mounted at a particular angle in combination with a projector which allows the television picture to be reflected and transmitted upon a proper surface in proper orientation.

An object of the present invention is to provide such a device which provides high quality projection and magnification in a simple, attractive convenient arrangement without modifying or misusing the television set.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
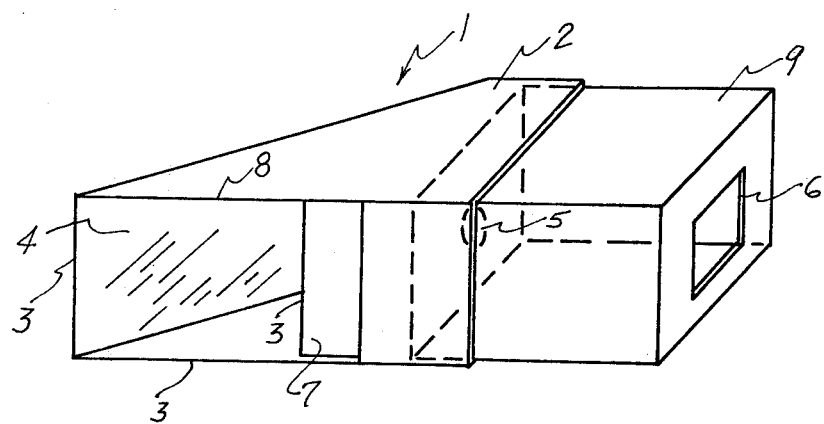
FIG. 1 is a perspective view of a projector device used in and constructed in accordance with and embodying the present invention.

Referring now in more detail and by reference characters to the drawings which illustrate practical embodiments of the present invention, FIG. 1, is a perspective view of a projector, 1, constructed in accordance with, used in and embodying the present invention.

As shown in FIG. 1, projector device, 1, comprises housing, 2, which is provided with inlet opening, 3, angularly disposed reflective surface, 4, lens, 5, and projector aperture, 6.

As shown in FIG. 1, the width of opening, 3, may be controlled by sliding door, 7. Reflective surface, 4, is preferably mounted or disposed at an angle of 45 degrees from an edge, 8, of projector, 1. Lens, 5, may typically be a flat plastic fresnel lens. Aperture, 6, and its distance from lens, 5, are determined from lens, 5. The device may be focused, i.e., the distance from surface, 4, to lens, 5, may be adjusted by mounting lens, 5, in a separable focal housing, 9.

Figure 2:
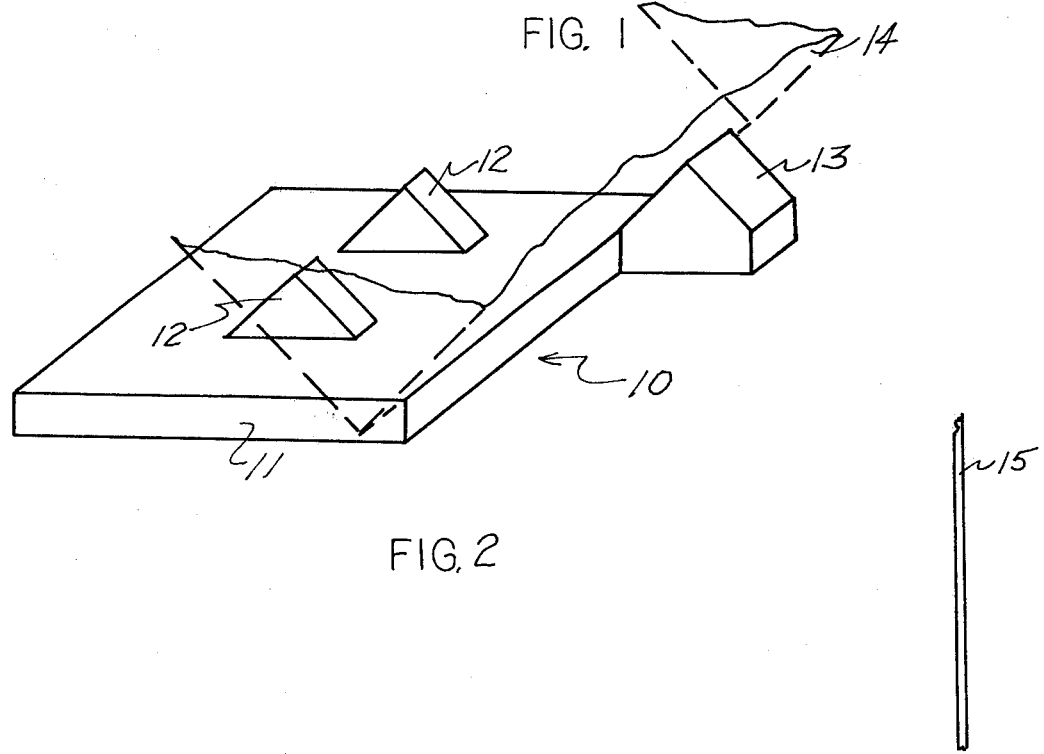
FIG. 2 is a perspective view of a television stand constructed in accordance with and embodying the present invention.

FIG. 2, illustrates the television stand, 10, to be used with projector, 1, and is seen to comprise base, 11, forward tilting members, 12, and support member, 13. A television, 14, is shown in phantom.

Figure 3:
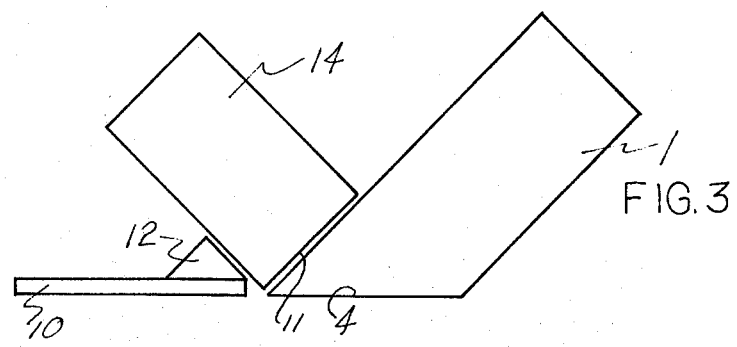
FIG. 3 is a perspective view of a projector and stand constructed in accordance with and embodying the present invention.

The combination projector, 1, and television stand, 10, with a television set, 14, mounted thereon, and their relative relationships are shown in FIG. 3, wherein it is seen that the picture from face, 11, of set, 14, is caused to be reflected by surface, 4, through lens, 5, and projector aperture, 6, to the appropriate wall or screen, 15.

It should be understood that changes and modifications in the form, construction, arrangement, and combination of the television stand and projector device and methods of making and using the same may be made and substituted for those herein shown and described without departing from the nature and principle of my invention.

Having thus described my invention, what I claim is new and desire to secure by United States Letters Patent is:

1. A television projector and stand comprising,
   a television stand, said television stand comprising a flat sheet, a plurality of aligned triangular shaped tilting members mounted on said sheet, and a support member mounted on said sheet such that together with said tilting members a television can be mounted on the stand with the screen of the television at substantially 45 degrees to said flat sheet,
   projector means disposed proximate said television stand, said projector means comprising,
   first housing means, said first housing means comprising a hollow rectangular cross sectioned cylindrical member, a first end open and a second end closed by an end wall disposed at an angle less than 90 degrees to the axis of said cylinder said first open end confronting the television screen and said closed end wall disposed on the same surface as said flat sheet of the television stand,
   a reflective surface operably mounted in said housing on the inner surface of said end wall, an aperture provided on a side wall of said cylindrical member opposite said reflective surface,
   a movable second hollow rectangular cross sectioned cylindrical member operably mounted in the open end of said first cylindrical member, closed at one end by a wall provided with a lens therein and closed at the other end by a wall provided with an aperture therein.

* * * * *